United States Patent
Eckert et al.

(10) Patent No.: US 10,114,914 B2
(45) Date of Patent: Oct. 30, 2018

(54) LAYOUT EFFECT CHARACTERIZATION FOR INTEGRATED CIRCUITS

(71) Applicant: International Business Machines Corporation, Armonk, NY (US)

(72) Inventors: Martin Eckert, Moetzingen (DE); Thomas Gentner, Boeblingen (DE); Jens Kuenzer, Boeblingen (DE); Antje Mueller, Holzgerlingen (DE); Thomas Strach, Wildberg (DE); Otto A. Torreiter, Leinfelden-Echterdingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/823,712

(22) Filed: Nov. 28, 2017

(65) Prior Publication Data

US 2018/0107771 A1    Apr. 19, 2018

Related U.S. Application Data (63) Continuation of application No. 15/594,782, filed on May 15, 2017, now Pat. No. 9,904,748, which is a
(Continued)

(51) Int. Cl.
*G06F 17/50* (2006.01)

(52) U.S. Cl.
CPC ...... *G06F 17/5009* (2013.01); *G06F 17/5081* (2013.01)

(58) Field of Classification Search
USPC .................. 716/111, 112, 114, 116
See application file for complete search history.

(56) References Cited

U.S. PATENT DOCUMENTS

| 8,887,120 B1 * | 11/2014 | Verma ................. G06F 17/5031 326/101 |
| 2004/0119504 A1 * | 6/2004 | Baude ................. G06K 19/0701 326/104 |

(Continued)

OTHER PUBLICATIONS

List of IBM Patents or Patent Applications Treated as Related, Nov. 28, 2017, 2 pages.
(Continued)

*Primary Examiner* — Brian Ngo
(74) *Attorney, Agent, or Firm* — Cantor Colburn LLP; Margaret A. McNamara (57) ABSTRACT

A system for layout effect characterization of an integrated circuit includes a memory having computer readable instructions and a processor for executing the computer readable instructions. The computer readable instructions include selecting an adjustable clock setting of an input clock for a layout effect characterization circuit of the integrated circuit and enabling a predetermined duty cycle of the input clock to pass through a plurality of inverting device chains including a reference chain and one or more chains having a different inverting device arrangement and a same number of inverting devices per chain. The computer readable instructions also include measuring a captured output of the one or more chains having the different inverting device arrangement and a captured output of the reference chain.

15 Claims, 8 Drawing Sheets

Related U.S. Application Data continuation of application No. 15/292,422, filed on Oct. 13, 2016, now Pat. No. 9,740,813.

(56) References Cited

U.S. PATENT DOCUMENTS

| | | | |
|---|---|---|---|
| 2004/0125521 A1* | 7/2004 | Sailing | H01L 27/0285 361/56 |
| 2009/0132971 A1* | 5/2009 | Boerstler | G06F 17/5045 716/132 |
| 2014/0062559 A1* | 3/2014 | Gonzalez | H03K 5/1565 327/175 |
| 2016/0255425 A1* | 9/2016 | Polster | H04Q 11/0005 398/45 |

OTHER PUBLICATIONS

U.S. Appl. No. 15/292,422, filed Oct. 13, 2016, Entitled: Layout Effect Characterization for Integrated Circuits, First Named Inventor: Martin Eckert.

U.S. Appl. No. 15/594,782, filed May 15, 2017, Entitled: Layout Effect Characterization for Integrated Circuits, First Named Inventor: Martin Eckert.

* cited by examiner

LAYOUT EFFECT CHARACTERIZATION FOR INTEGRATED CIRCUITS

This application is a continuation of U.S. patent application Ser. No. 15/594,782 filed May 15, 2017, which claims priority from U.S. application Ser. No. 15/292,422 filed Oct. 13, 2016, now U.S. Pat. No. 9,740,813 the entire contents of which are incorporated herein by reference.

BACKGROUND

Aspects are related generally to integrated circuit design, and more specifically to layout effect characterization for integrated circuits.

As technology structure sizes have been reduced, transistor circuit layout and interconnecting structure have been observed to impact extended circuit behavior and characteristics. For example, signal propagation delays may change depending on layout and structure variations in functionally equivalent circuits. Typical testing systems use a ring oscillator or single transistor characterization analysis to monitor current, timing, and other parameters. Ring oscillators can support frequency changes but typically do not show transition impacts. Ring oscillators also operate at a relatively low frequency at chip output pins for reliable measurements.

Existing test systems can require complicated structures to measure the desired characteristics of interest with accuracy. Layout dependent effects can be so small that they may not be directly measurable at the individual transistor level. Individual transistor measurements may produce generalized results making it difficult to distinguish a weak transistor due to manufacturing process issues, such as doping, versus layout effects.

When asymmetric attributes of individual devices in a chain are observed under certain operating conditions, there can be different rising and falling edge propagation speeds. As chains of devices are arranged in various orientations, the collective effects may vary such that the overall timing of an as-built circuit varies from the as-designed circuit significantly enough to result in fault conditions. In some examples, an oscillating input to a chain of devices, such as inverters, does not fully propagate through the chain due to layout effects.

At present, there is a need for circuits, systems, and methods to perform layout effect characterization for integrated circuits, such that design parameters can be monitored and adjusted at design time and/or after manufacturing.

SUMMARY

According to one embodiment, a system for layout effect characterization of an integrated circuit includes a memory having computer readable instructions and a processor for executing the computer readable instructions. The computer readable instructions include selecting an adjustable clock setting of an input clock for a layout effect characterization circuit of the integrated circuit and enabling a predetermined duty cycle of the input clock to pass through a plurality of inverting device chains including a reference chain and one or more chains having a different inverting device arrangement and a same number of inverting devices per chain. The computer readable instructions also include measuring a captured output of the one or more chains having the different inverting device arrangement and a captured output of the reference chain. Advantages can include a system to monitoring a layout effect characterization circuit to accommodate a pulse width reduction.

According to another embodiment, a method for characterizing layout effects of an integrated circuit includes selecting an adjustable clock setting of an input clock for a layout effect characterization circuit of the integrated circuit and enabling a predetermined duty cycle of the input clock to pass through a plurality of inverting device chains including a reference chain and one or more chains having a different inverting device arrangement and a same number of inverting devices per chain. A captured output of the one or more chains having the different inverting device arrangement is measured along with a captured output of the reference chain. Advantages can include a method to monitoring a layout effect characterization circuit to accommodate a pulse width reduction.

According to another embodiment, a computer program product includes a computer readable storage medium having program instructions embodied therewith. The program instructions are executable by a processor to cause the computer processor to perform selecting an adjustable clock setting of an input clock for a layout effect characterization circuit of an integrated circuit and enabling a predetermined duty cycle of the input clock to pass through a plurality of inverting device chains including a reference chain and one or more chains having a different inverting device arrangement and a same number of inverting devices per chain. The program instructions are further executable by a processor to cause the computer processor to perform measuring a captured output of the one or more chains having the different inverting device arrangement and a captured output of the reference chain. Advantages can include measuring a layout effect characterization circuit to accommodate a pulse width reduction by using a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Embodiments quantitatively determine the impact of process related layout effects to transistors and circuit structures in an integrated circuit layout. Embodiments can measure, store and evaluate measured effects and may take corrective actions. Advantages can include early detection of layout effects on signal propagation. When layout effect analysis is performed at design time, designers can better determine preferred device orientation combinations, arrangements, and operating frequencies to ensure that signal integrity is maintained through a plurality of chained devices within an integrated circuit. Layout effect characterization circuits can also be used to verify that manufacturing process quality is consistently maintained across a plurality of manufactured integrated circuits. Layout effect characterization circuits may further be used to adjust operating characteristics post production, such as clock pulse shape adjustments.

Figure 1:
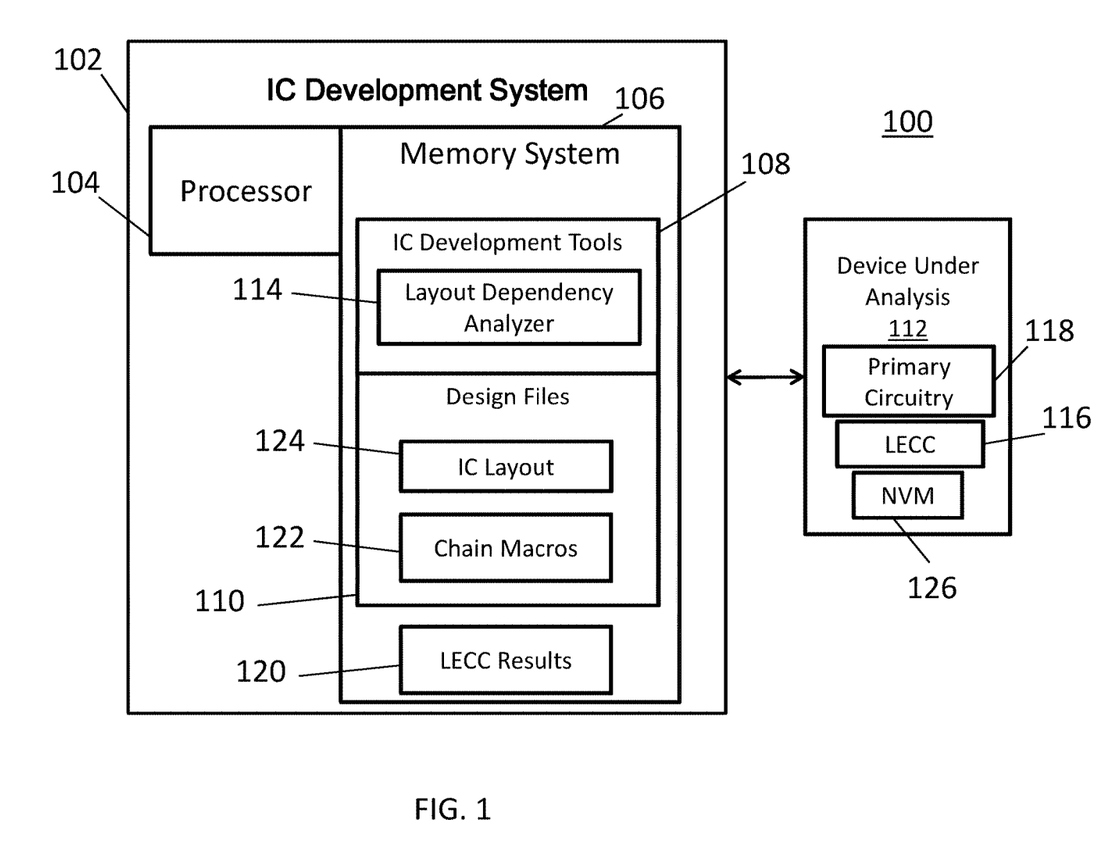
FIG. 1 illustrates a system for integrated circuit layout effect characterization in accordance with an embodiment.

Turning now to FIG. 1, a system 100 is generally shown that includes an integrated circuit (IC) development system 102 configured to incorporate an integrated circuit layout 124 into a device under analysis 112. The IC development system 102 can fabricate the device under analysis 112 as an integrated circuit chip. The device under analysis 112 can be distributed by the fabricator in raw wafer form (that is, as a single wafer that has multiple unpackaged chips), as a bare die, or in a packaged form. In the latter case the device under analysis 112 can be mounted in a single chip package (such as a plastic carrier, with leads that are affixed to a motherboard or other higher level carrier) or in a multichip package (such as a ceramic carrier that has either or both surface interconnections or buried interconnections). The device under analysis 112 may also be integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The IC development system 102 includes a processor 104 and a memory system 106. The processor 104 can be any type of processing circuit, including multiple instances thereof, that is configurable to execute processes further described herein, where the memory system 106 is an example of a tangible storage medium. The memory system 106 can include IC development tools 108 and design files 110. The IC development tools 108 may be partitioned as one or more computer program products. For example, the IC development tools 108 can include a layout dependency analyzer 114 and other executable applications (not depicted). The design files 110 can include definition files for the integrated circuit layout 124 and chain macros 122. The integrated circuit layout 124 can define sizing, placement, connections, and the like for the circuitry within the device under analysis 112, including primary circuitry 118. The chain macros 122 can define various patterns of a plurality of inverting device chains including a reference chain and one or more chains having a different inverting device arrangement and the same number of inverting devices per chain to include in the integrated circuit layout 124. When two or more of the chain macros 122 are selected to include in the integrated circuit layout 124, the resulting circuitry can be physically embodied in a layout effect characterization circuit (LECC) 116 in the device under analysis 112. The layout dependency analyzer 114 may be used to form the LECC 116 and to configure and/or interface with the LECC 116 upon formation within the device under analysis 112.

The LECC 116 can be used to determine effects of various layout options within the device under analysis 112 by characterizing placement, orientation, and clock frequency effects, for example. LECC results 120 can be captured locally in non-volatile memory 126 of the device under analysis 112 and/or in the memory system 106 of the IC development system 102. As the LECC results 120 are collected and analyzed, the integrated circuit layout 124 can be adjusted to change placement, orientation, and/or clock characteristics of the primary circuitry 118 to improve signal propagation performance and reduce the risk of signal degradation including width reduction up to a pulse loss as further described herein. For instance, the primary circuitry 118 can be a processor or controller with many transistors interconnected in a three-dimensional package of stacked horizontal and vertical cells.

The chain macros 122 can define various chain configurations of inverting devices (such as inverters, NAND gates, NOR gates, and the like) using an even number of inverting devices to produce an observable output having the same state as the input under normal operating conditions. Alternatively, an odd number of inverting devices can be used to produce an observable output having an inverted state as the input under normal operating conditions. To achieve a comparable effect for multiple chains, the same device type and a number of devices is included in each chain but in differing orientation patterns. For example, chains in the chain macros 122 can include inverters, NOR gates, NAND gates, or other known logic gates arranged with varying horizontal and vertical connection patterns, as well as various rotation patterns.

Figure 2:
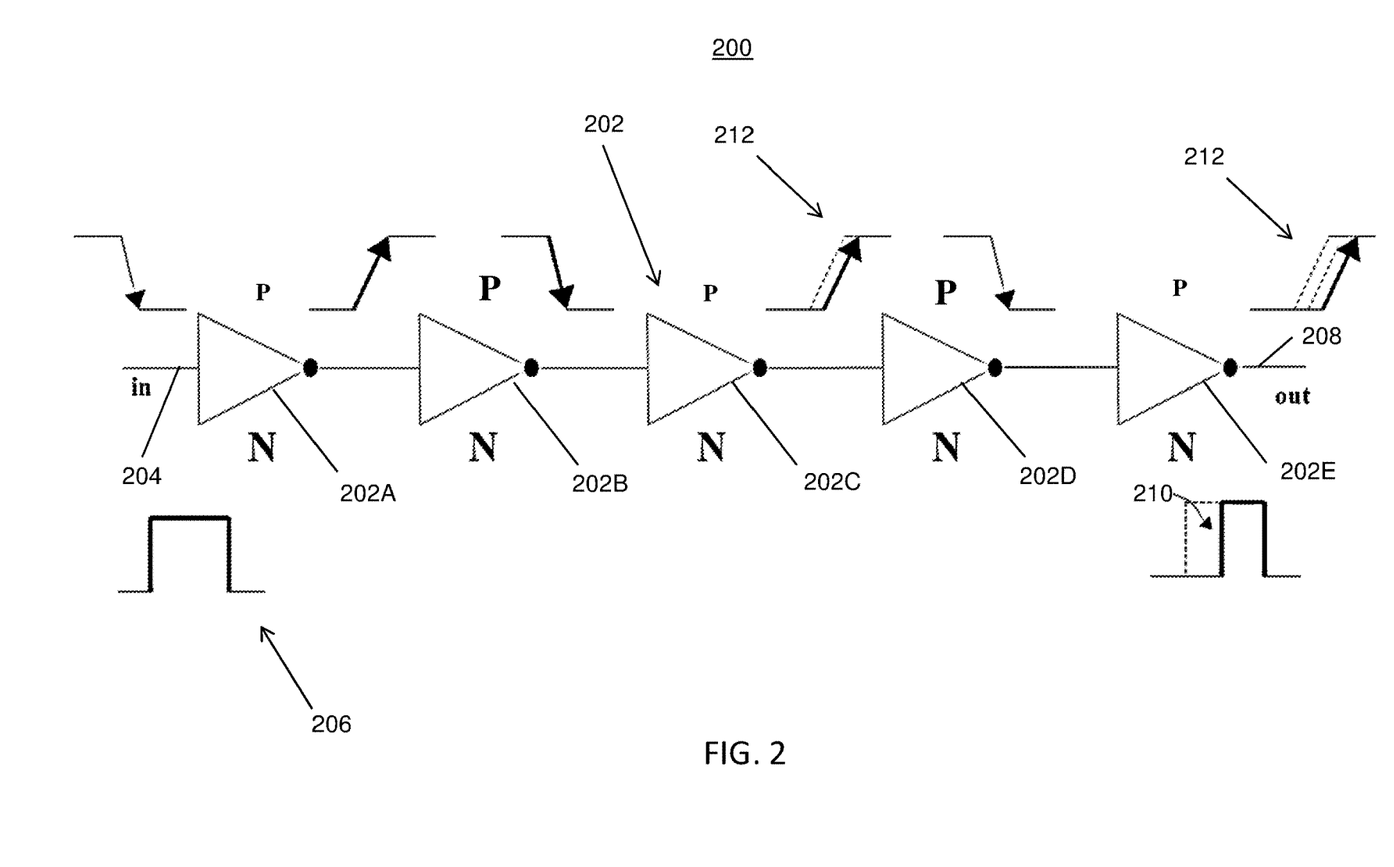
FIG. 2 illustrates a chain of inverting devices in accordance with an embodiment.

FIG. 2 depicts an example of a chain 200 of inverting devices 202 depicted as inverters. The chain 200 includes an alternating pattern of n-type inverting devices 202A, 202C, 202E having a stronger N transistor characteristic and p-type inverting devices 202B, 202D having a stronger P transistor characteristic. An input 204 to the chain 200 receives an input clock pulse 206 that propagates through the inverting devices 202 to an output 208 of the chain 200 as an output pulse 210. The asymmetric attributes of every other inverting device 202 leads to different propagation speeds for rising and falling edges. For example, rising edge velocity may be less than falling edge velocity, resulting in timing variations 212 through the chain 200 and a modified (e.g., reduced) duty cycle at the output pulse 210 as compared to the input clock pulse 206. Changes in the physical arrangement of the inverting devices 202 can result in lesser or greater asymmetries in signal propagation.

Figure 3:
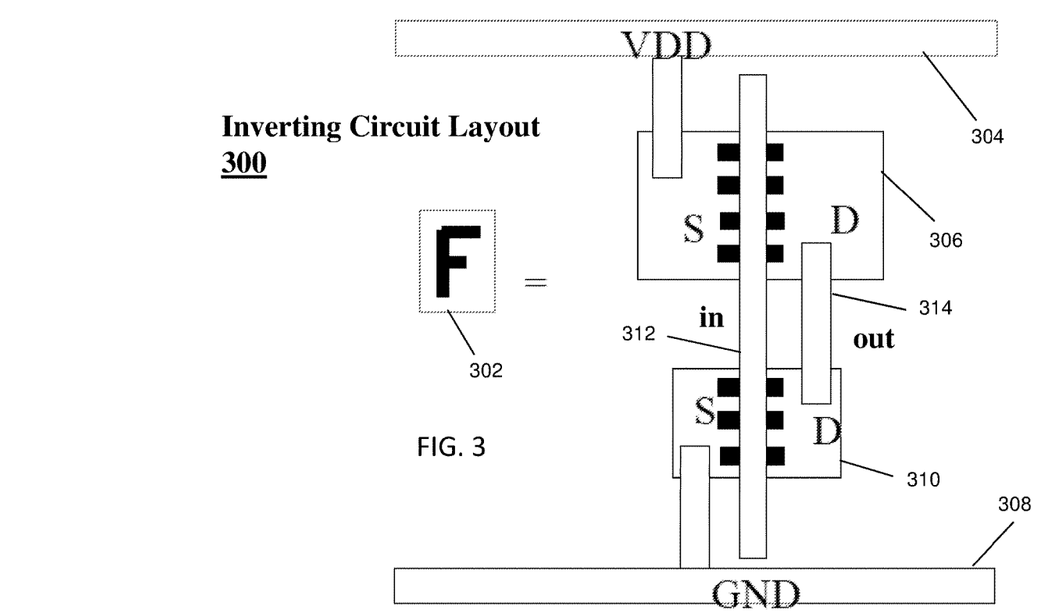
FIG. 3 illustrates an inverting circuit layout in accordance with an embodiment.

FIG. 3 illustrates an inverting circuit layout 300 for an inverting device 302 in accordance with an embodiment. A power supply rail VDD 304 is coupled to a PFET transistor 306, and a ground rail 308 is coupled to an NFET transistor 310. Depending on the relative drive strength of the PFET transistor 306 to the drive strength of the NFET transistor 310, the inverting device 302 can have a stronger or weaker p-type characteristic or a stronger or weaker n-type characteristic. A device input 312 can link an input "S" portion of the transistors 306 and 310, and a device output 314 can link an output "D" portion of the transistors 306 and 310. The inverting device 302 is schematically depicted as the letter "F" as a shorthand notation for the arrangement of FIG. 3, where rotation of the letter "F" indicates rotation of the inverting circuit layout 300.

Figure 4:
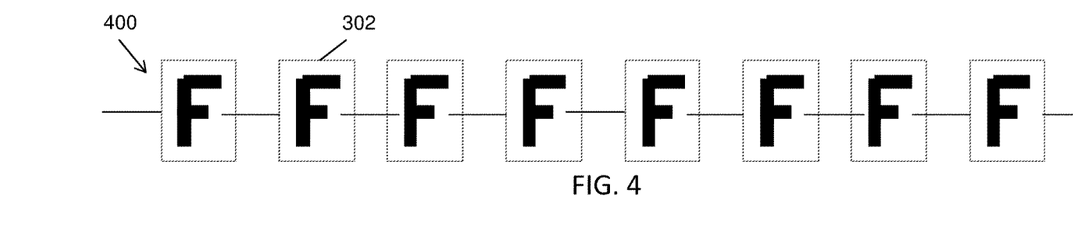
FIG. 4 illustrates a reference chain of inverting devices in accordance with an embodiment.
Figure 5:
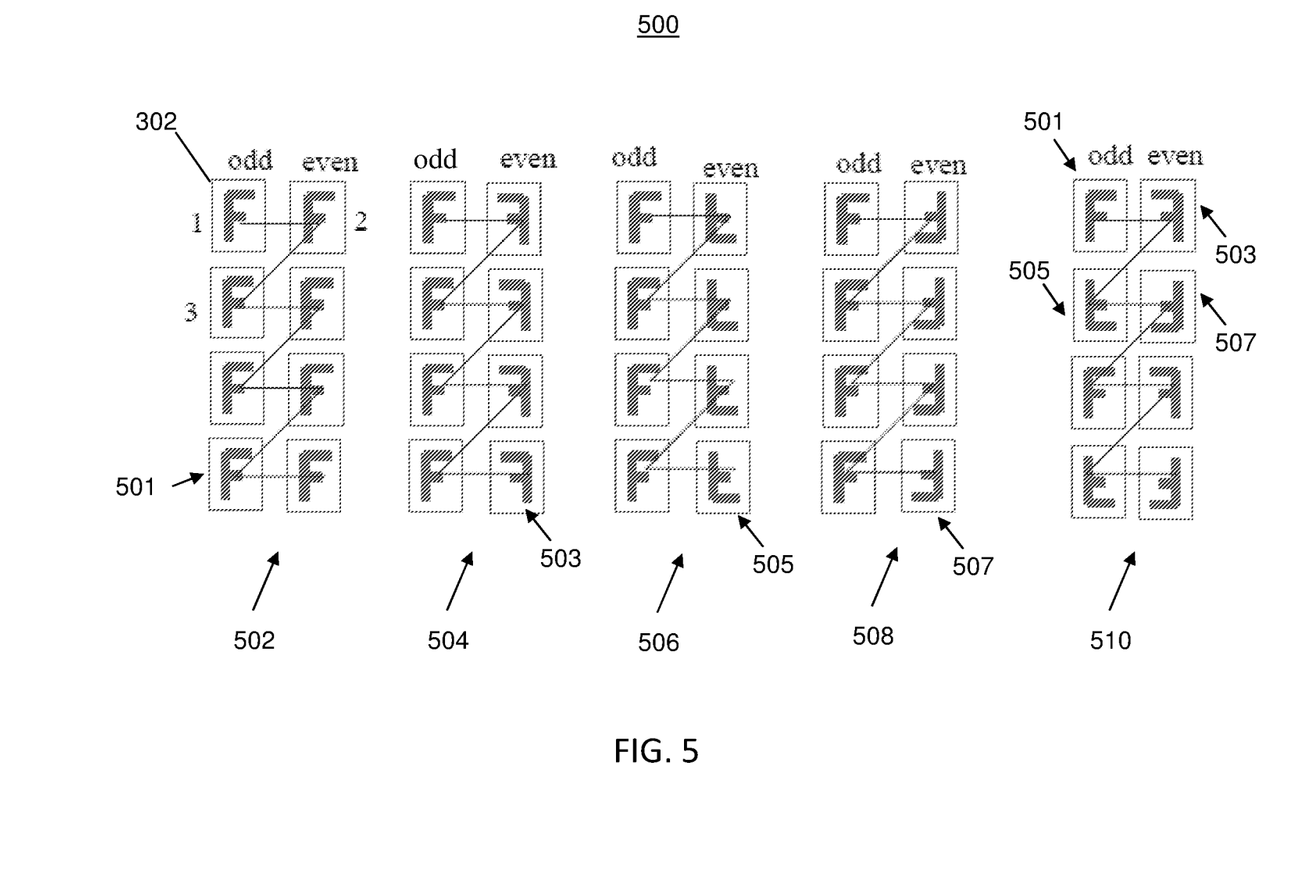
FIG. 5 illustrates examples of various chains of inverting devices with orientation variations in accordance with an embodiment.

FIG. 4 illustrates a reference chain 400 of the inverting devices 302 of FIG. 3. Using one chain of the chain macros 122 of FIG. 1 as the reference chain 400 establishes default devices, parameters and physical orientation from which variations can be made as one or more chains having a different inverting device arrangement. FIG. 5 illustrates examples of various chains 500 of inverting devices 302 with orientation variations. While the reference chain 400 is in a single horizontal or vertical line, the chains 500 have both horizontal and vertical variations. For example, chain 502 includes inverting devices 302 having a same first orientation 501 as the reference chain 400; however, odd positioned inverting devices 302 (e.g., first, third, fifth, etc.) output to even positioned inverting devices 302 (e.g., second, fourth, sixth, etc.) in the same row with a different column, and even positioned inverting devices 302 output to odd positioned inverting devices 302 in a different row and a different column (e.g., a zig-zag pattern). Chain 504 is similar to chain 502 except that all of the even positioned inverting devices 302 are oriented in a second orientation 503 as a mirror image of the odd positioned inverting devices 302. Chain 506 rotates the mirror image even positioned inverting devices 302 of chain 504 by 180 degrees in a third orientation 505. Chain 508 rotates the even positioned inverting devices 302 of chain 502 by 180 degrees in a fourth orientation 507. Chain 510 alternates in a sequence of the inverting devices 302 between the first orientation 501, the second orientation 503, the third orientation 505, and the fourth orientation 507. In embodiments, odd positioned inverting devices 302 and even positioned inverting devices 302 can be of opposite types (e.g., p-type or n-type) to enhance rise/fall timing variation effects. It will be understood that other combinations of various orientations, chain lengths, and neighboring devices are contemplated. For example, the chains 502-510 may have neighboring inverting devices 302, transistors, traces, and/or other devices in close physical proximity that are subject to similar manufacturing process effects.

In embodiments, the chains 502-510 can be in close physical proximity of the reference chain 400 of FIG. 4 with a minimum distance limited by technology rules and a maximum of fifty times of the maximum reference chain layout size. Several instances of the chains 502-510 as defined in the chain macros 122 of FIG. 1 can be placed on the device under analysis 112 of FIG. 1 to detect process variations across the device under analysis 112. The chain length of the chains 502-510 depends on the effect per single device. Chains 502-510 can be repeated as long as an asymmetry effect becomes measurable. In some embodiments, each of the chains 502-510 can range in size from a minimum of two up to two hundred fifty-six of the inverting devices 302.

A systematic imbalance can be achieved on every other inverting device 302 by one or more variations, such as placing every second inverting device 302 into the same column or row while changing the orientation of the inverting device 302. The layout direction can be changed from a vertical to horizontal cell stack. Additional structures (such as transistors, printed circuits, and/or wires) may be added to observe neighborhood impacts, which may be due to manufacturing process effects or optical effects horizontally/vertically (e.g., multi exposure process/interference effects). The effect of the variations is that on every second inverting device 302 either the p-type or the n-type transistors get the same systematic process impact leading to having weak/strong p or weak/strong n-devices. As a result, a clock edge propagating through each chain 502-510 will experience a same impact on the same edge direction. Over each chain 502-510 the effect is accumulated and leads to either smaller on-times (weak p-type device) or wider on-times (weak n-type device).

Figure 6:
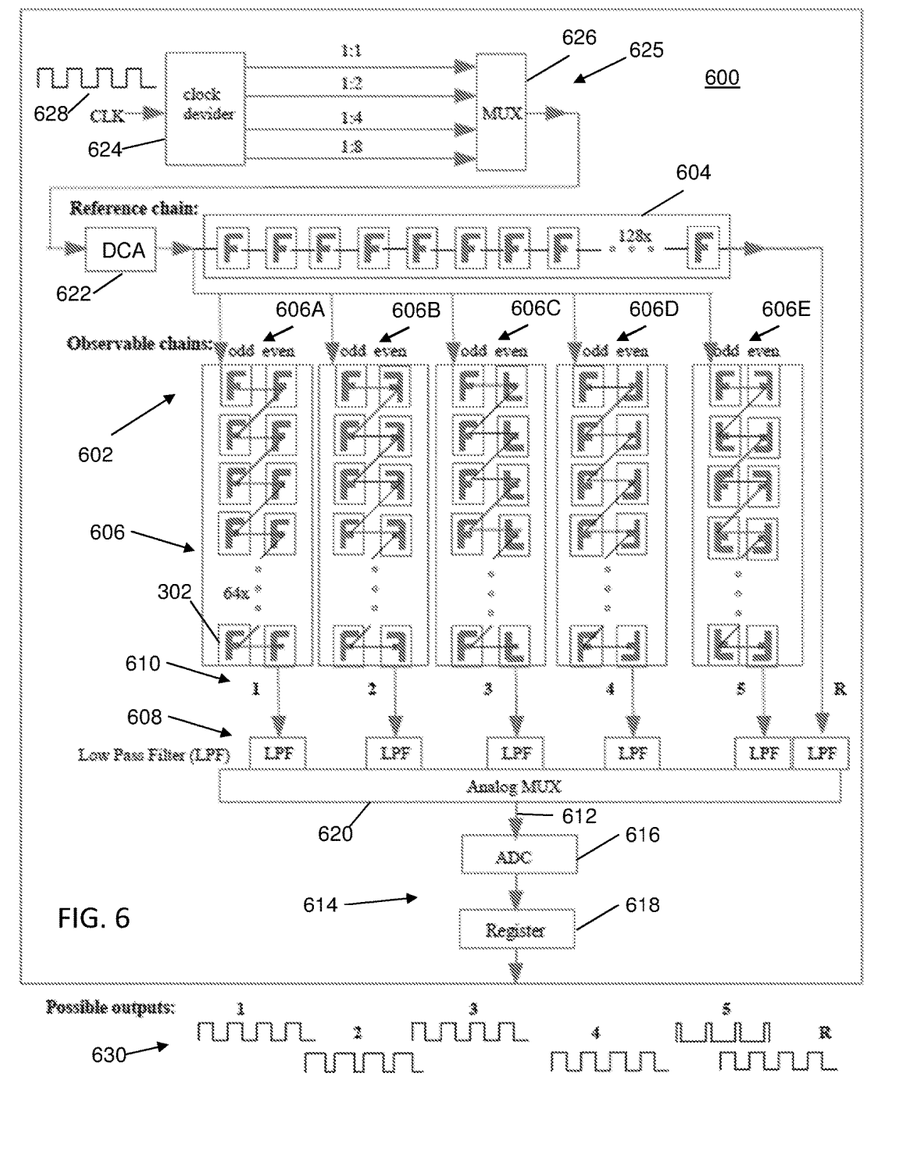
FIG. 6 illustrates a layout effect characterization circuit in accordance with an embodiment.

FIG. 6 illustrates a layout effect characterization circuit (LECC) 600 in accordance with an embodiment as an example of the LECC 116 of FIG. 1. The LECC 600 includes a plurality of inverting device chains 602 including a reference chain 604 and one or more chains 606 having a different inverting device arrangement and the same number of inverting devices 302 per chain 606. In the example of FIG. 6, reference chain 604 is an embodiment of the reference chain 400 of FIG. 4 with one hundred twenty-eight inverting devices 302. Chain 606A is an embodiment of chain 502 of FIG. 5 with one hundred twenty-eight inverting devices 302. Chain 606B is an embodiment of chain 504 of FIG. 5 with one hundred twenty-eight inverting devices 302. Chain 606C is an embodiment of chain 506 of FIG. 5 with one hundred twenty-eight inverting devices 302. Chain 606D is an embodiment of chain 508 of FIG. 5 with one hundred twenty-eight inverting devices 302. Chain 606E is an embodiment of chain 510 of FIG. 5 with one hundred twenty-eight inverting devices 302.

A low pass filter 608 is coupled to an output 610 of the inverting device chains 602 to produce a filtered output 612. The low pass filter 608 can extract a DC component of the clock shape at the output 610 of the inverting device chains 602. An output capture circuit 614 is coupled to the filtered output 612 to enable a comparison of a captured filtered output of the one or more chains 606 having the different inverting device arrangement to a captured filtered output of the reference chain 604. The output capture circuit 614 can include at least one analog-to-digital converter 616 operable to sample the filtered output 612 and at least one register 618 to capture one or more samples of the filtered output 612 as the captured filtered output. In the example of FIG. 6, each of the chains 606 and reference chain 604 have separate instances of the low pass filter 608, and an analog multiplexer 620 alternates the selection of the filtered output 612 from the various sources. Captured filtered output of the output capture circuit 614 can be stored as the LECC results 120 of FIG. 1, for instance, within the memory system 106 of FIG. 1 and/or in the non-volatile memory 126 of FIG. 1.

A duty cycle adjuster 622 can be coupled to an input of the inverting device chains 602, where the duty cycle adjuster 622 is operable to output a predetermined duty cycle to the inverting device chains 602, such as a 50% duty cycle. In some embodiments, the duty cycle adjuster 622 is a latch-based feedback circuit that divides output of the adjustable clock 625 in half to make a balanced clock. The duty cycle adjuster 622 can also be duplicated and inserted into each of the inverting device chains 602 to provide more control over the accuracy of the duty cycle. An adjustable clock 625 can drive a variable clock frequency to the duty cycle adjuster 622, for instance, by selecting a desired clock frequency through multiplexer 626 or other circuitry, such as a phase-locked loop. Making the clock frequency variable gives a measure at which frequency pulses start to disappear due to propagation effects. Given an input clock 628, a number of possible outputs 630 can result through the inverting device chains 602 with duty cycle variations. The DC component of the output can indicate whether the duty cycle has increased or decreased as compared to the reference chain 604.

Figure 7:
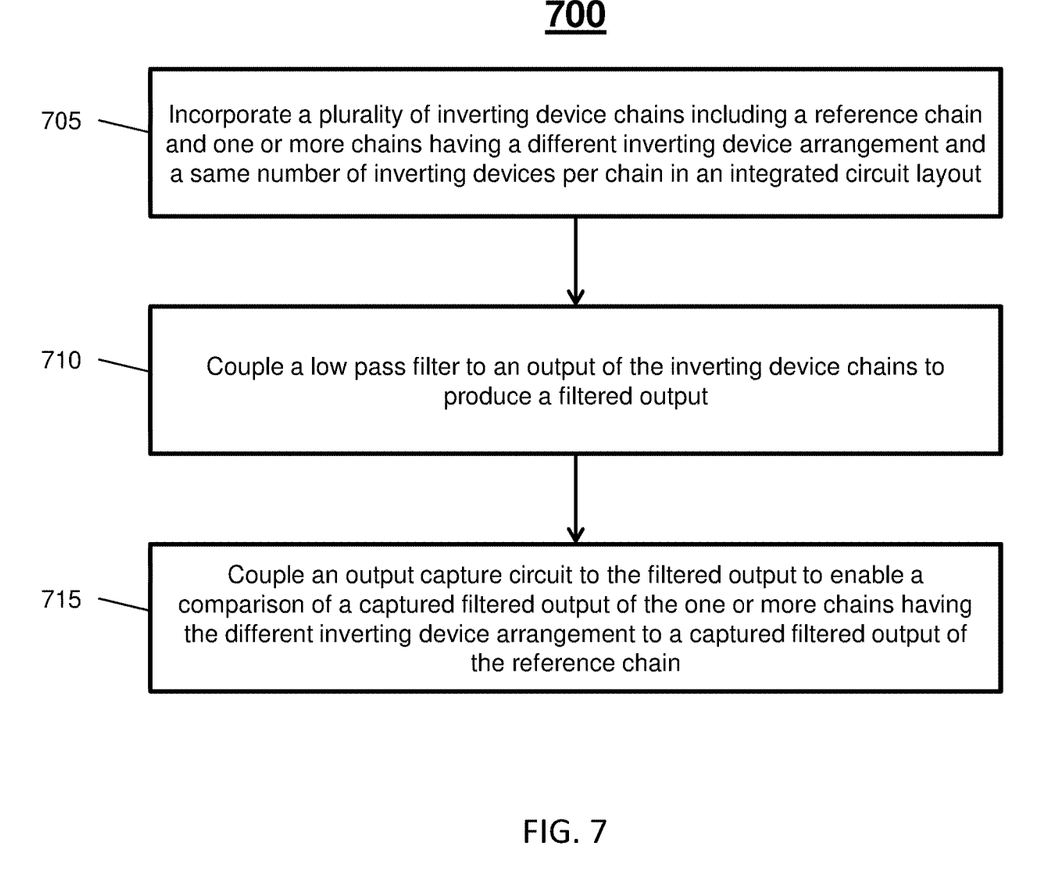
FIG. 7 illustrates a process flow for integrated circuit layout effect characterization in accordance with an embodiment.

Turning now to FIG. 7, a flow diagram of a process 700 for forming a layout effect characterization circuit is generally shown in accordance with an embodiment. The process 700 is described with reference to FIGS. 1-6 and may include additional steps beyond those depicted in FIG. 7. The process 700 is described with respect to the LECC 600 of FIG. 6; however, other variations can add or remove elements beyond the elements depicted in FIG. 6. The process 700 can be implemented by the layout dependency analyzer 114 of FIG. 1.

At block 705, the layout dependency analyzer 114 incorporates a plurality of inverting device chains 602 including a reference chain 604 and one or more chains 606 having a different inverting device arrangement and the same number of inverting devices 302 per chain 606 in an integrated circuit layout 124. The inverting device chains 602 can be selected from the chain macros 122 depending on the desired variation characteristics and chain length to create the LECC 600. An adjustable clock 625 can be provided to drive a variable clock frequency to a duty cycle adjuster 622 coupled to an input of the inverting device chains 602, where the duty cycle adjuster 622 is operable to output a predetermined duty cycle to the inverting device chains 602. In the example of FIG. 6, the adjustable clock 625 uses a clock divider 624 to adjust the clock frequency. In other embodiments, the adjustable clock 625 uses a phase-locked loop multiplier to achieve a targeted frequency.

The inverting device chains 602 can include a plurality of alternating n-type and p-type inverting devices 302. Each of the one or more chains 606 having the different inverting device arrangement can include at least one orientation difference (e.g., first, second, third, or fourth orientation 501, 503, 505, 507) in the inverting devices 302 between the one or more chains 606. Each of the one or more chains 606 having the different inverting device arrangement can have a change in layout direction between a vertical and a horizontal cell stack with every second inverting device placed in the same row or same column, for instance, as depicted in chains 606A-606E. One or more additional structures can be placed proximate to the one or more chains 606 to observe neighborhood impacts.

At block 710, a low pass filter 608 is coupled to an output 610 of the inverting device chains 602 to produce a filtered output 612. At block 715, an output capture circuit 614 is coupled to the filtered output 612 to enable a comparison of a captured filtered output of the one or more chains 606 having the different inverting device arrangement to a captured filtered output of the reference chain 604.

Figure 8:
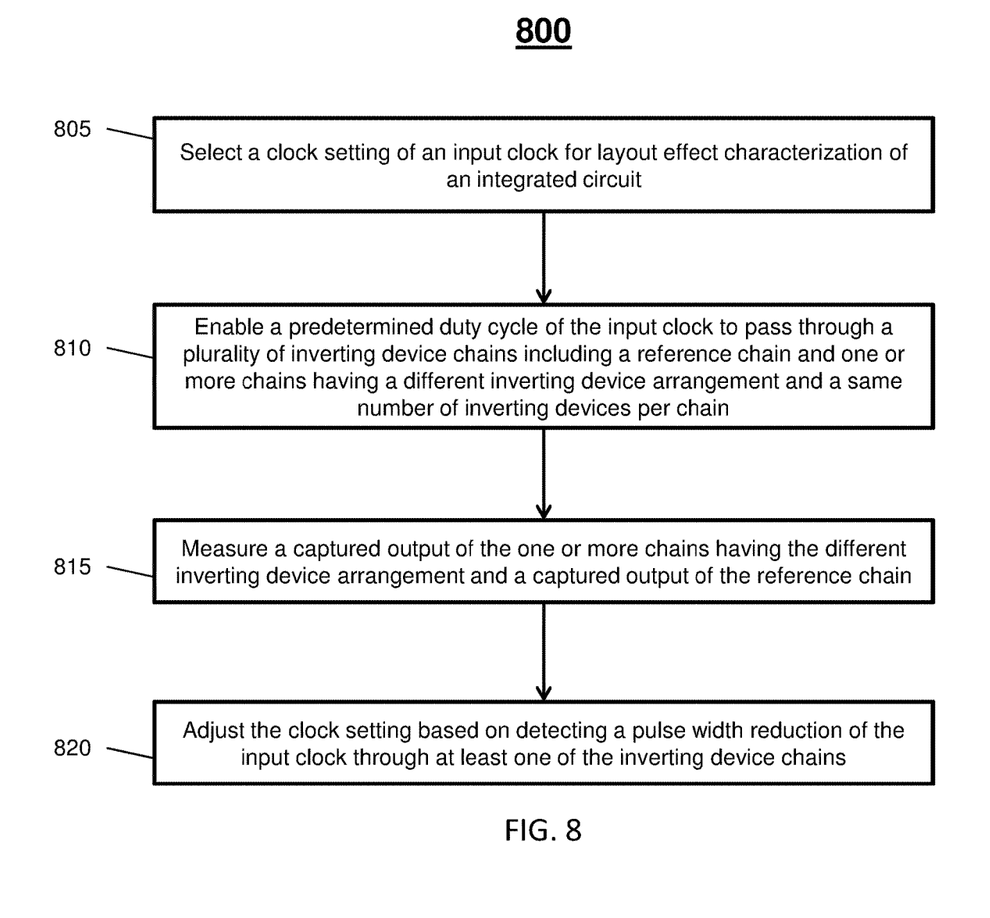
FIG. 8 illustrates a process flow for characterizing layout effects of an integrated circuit in accordance with an embodiment.

Turning now to FIG. 8, a flow diagram of a process 800 for characterizing layout effects of an integrated circuit is generally shown in accordance with an embodiment. The process 800 is described with reference to FIGS. 1-6 and may include additional steps beyond those depicted in FIG. 8. The process 800 is described with respect to the LECC 600 of FIG. 6; however, other variations can be performed using additional or fewer elements beyond the elements depicted in FIG. 6. The process 800 can be performed using the layout dependency analyzer 114 or other application on the IC development system 102 or other system (e.g., local to the device under analysis 112).

At block 805, an adjustable clock setting based on an input clock 628 is selected for the LECC 600 of an integrated circuit such as the device under analysis 112. For instance, multiplexer 626 can be controlled to select a specific clock frequency as a reduced factor of the input clock 628 through a clock divider 624 in adjustable clock 625. In alternate embodiments, a phase-locked loop (not depicted) or other clock adjustment circuitry can be included in the adjustable clock 625. At block 810, a predetermined duty cycle of the input clock 628 is enabled to pass through a plurality of inverting device chains 602 including a reference chain 604 and one or more chains 606 having a different inverting device arrangement and the same number of inverting devices 302 per chain. The predetermined duty cycle can be about a 50% duty cycle subject to system accuracy/tolerances. The predetermined duty cycle can be shaped or adjusted by the duty cycle adjuster 622.

At block 815, a captured output of the one or more chains 606 having the different inverting device arrangement and a captured output of the reference chain 604 are measured. At block 820, the adjustable clock setting can be adjusted based on detecting a pulse width reduction of the input clock 628 through at least one of the inverting device chains 602. A clock pulse shape of the adjustable clock 625 and/or output of the duty cycle adjuster 622 can be adjusted based on a detected difference between the captured output of the one or more chains 606 having the different inverting device arrangement and the captured output of the reference chain 604.

An ideal value to observe through the inverting device chains 602 is unchanged in value (e.g., 0.5*VDD) before and after the inverting device chains 602. A reduced value (e.g., below 0.5*VDD) indicates that the on-pulse shape is smaller, which means the p-device is relatively weaker (i.e., p/n is smaller than the reference). An increased value (e.g., above 0.5*VDD) indicates that the on-pulse shape is wider, which means the n-device is relatively weaker (i.e., p/n is larger than the reference). The amount of deviation from the ideal value is related to the strength of the effect. The effect per transistor can be approximated as the deviation (e.g., in millivolts) divided by the number of inverting devices 302 in each of the inverting device chains 602. Readings for each of the chains 606 can be compared against the reference chain 604 in an x/y direction (unaltered/equal inverting device layout) to correlate the duty cycle variation of the different layout versions of chains 606. By adjusting the drive strength of a weaker device (impacted one), the signal can be re-shaped again until DC level is back at the ideal level (e.g., 0.5*VDD) and the clock duty cycle is again 1:1.

By sampling on-chip the DC value and storing it, the lifetime behavior of the device under analysis 112 can be predicted. For example, adequate adjustments can be made in software for duty cycle correction depending on powered-on time elapsed and/or remaining. A pulse shape based on the input clock 628 on the device under analysis 112 can be adjusted after production if buffer/inverters of the device under analysis 112 follow one of the identified dependencies, for instance, by adjusting one or more parameters of the adjustable clock 625. The LECC 600 can be used to monitor the process impact on a wafer to wafer (chip-to-chip) basis.

Figure 9:
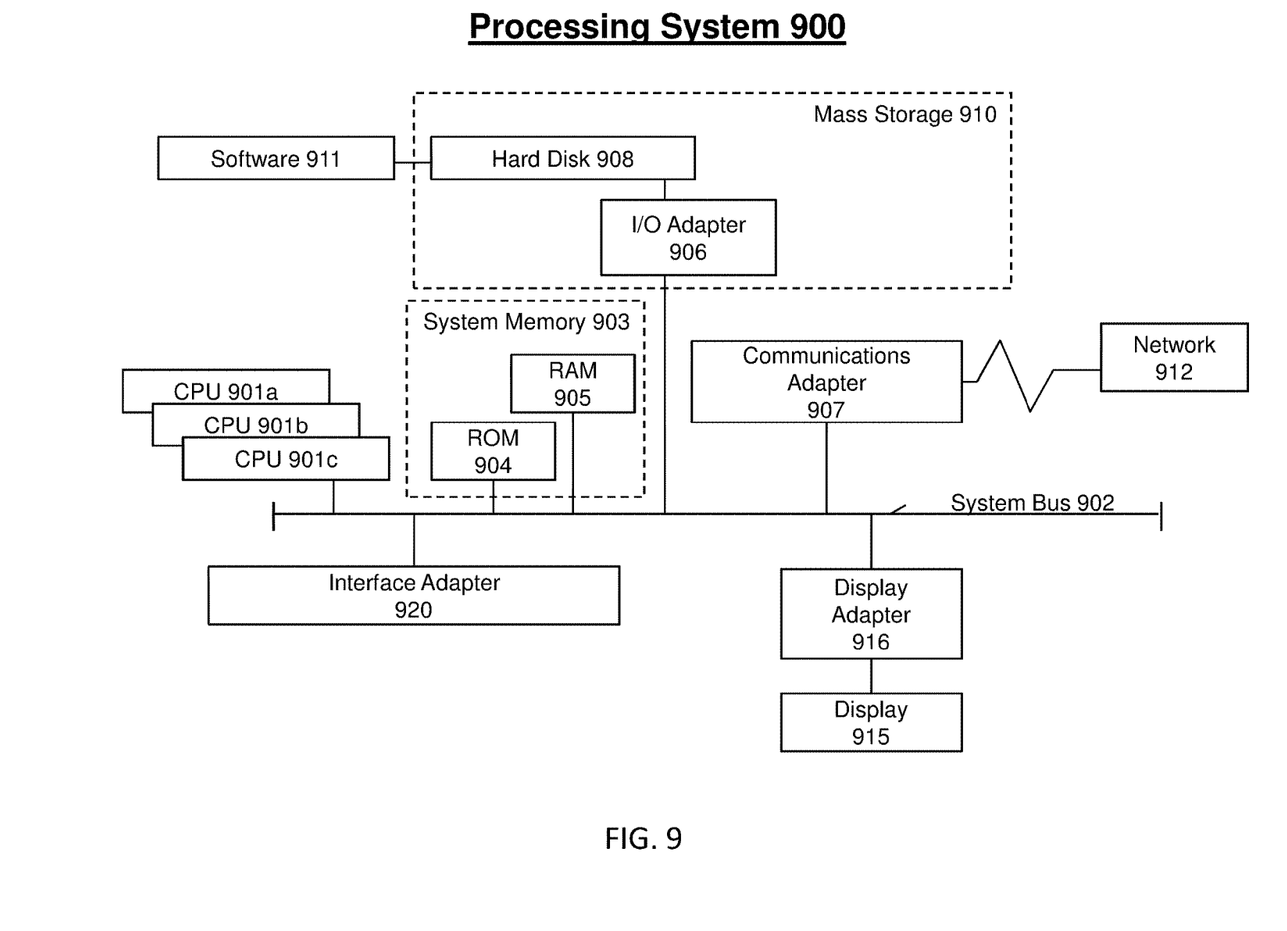
FIG. 9 illustrates a processing system in accordance with an embodiment.

Referring now to FIG. 9, there is shown an embodiment of a processing system 900 for implementing the teachings herein. In this embodiment, the processing system 900 has one or more central processing units (processors) 901a, 901b, 901c, etc. (collectively or generically referred to as processor(s) 901), each of which can include a layout effect characterization circuit (e.g., the LECC 116 of FIG. 1 or 600 of FIG. 6) and primary circuitry 118 of FIG. 1 to implement primary processor functionality. Alternatively, the processors 901 can be an embodiment of the processor 104 of FIG. 1. The processors 901, also referred to as processing circuits, are coupled via a system bus 902 to a system memory 903 and various other components (such as one or more integrated circuits include the LECC 116 of FIG. 1 or 600 of FIG. 6). The system memory 903 can include read only memory (ROM) 904 and random access memory (RAM) 905. The ROM 904 is coupled to system bus 902 and may include a basic input/output system (BIOS), which controls certain basic functions of the processing system 900. RAM 905 is read-write memory coupled to system bus 902 for use by the processors 901.

FIG. 9 further depicts an input/output (I/O) adapter 906 and a communications adapter 907 coupled to the system bus 902. I/O adapter 906 may be a small computer system interface (SCSI) adapter that communicates with a hard disk 908 and/or any other similar component. I/O adapter 906 and hard disk 908 are collectively referred to herein as mass storage 910. Software 911 for execution on the processing system 900 may be stored in mass storage 910. The mass storage 910 is an example of a tangible storage medium readable by the processors 901, where the software 911 is stored as instructions for execution by the processors 901 to perform a method, such as the process flows 700, 800 of FIGS. 7 and 8. Communications adapter 907 interconnects the system bus 902 with an outside network 912 enabling processing system 900 to communicate with other such systems. A display 915 is connected to system bus 902 via a display adapter 916, which may include a graphics controller to improve the performance of graphics intensive applications and a video controller. In one embodiment, adapters 906, 907, and 916 may be connected to one or more I/O buses that are connected to the system bus 902 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices can be connected to the system bus 902 via an interface adapter 920 and the display adapter 916. A keyboard, mouse, speaker can be interconnected to the system bus 902 via the interface adapter 920, which may include, for example, a Super I/O chip integrating multiple device adapters into a single integrated circuit.

Thus, as configured in FIG. 9, the processing system 900 includes processing capability in the form of processors 901, and, storage capability including the system memory 903 and the mass storage 910, input means such as keyboard and mouse, and output capability including speaker and the display 915. In one embodiment, a portion of the system memory 903 and the mass storage 910 collectively store an operating system, such as the z/OS or AIX operating system from IBM Corporation, to coordinate the functions of the various components shown in FIG. 9.

Technical effects and benefits include characterization of layout effects in an integrated circuit to enable design adjustments and/or configuration adjustments that reduce signal timing integrity losses attributable to device layout.

Embodiments may include a system and/or a method at any possible technical detail level of integration. The system may include a computer readable storage medium (or media) having computer readable program instructions thereon for causing a processor to carry out aspects of the embodiments herein. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for layout effect characterization of an integrated circuit, the system comprising:
   a memory having computer readable instructions; and
   a processor for executing the computer readable instructions, the computer readable instructions including:
   selecting an adjustable clock setting of an input clock for a layout effect characterization circuit of the integrated circuit;
   enabling a predetermined duty cycle of the input clock to pass through a plurality of inverting device chains including a reference chain and one or more chains having a different inverting device arrangement and a same number of inverting devices per chain;
   measuring a captured output of the one or more chains having the different inverting device arrangement and a captured output of the reference chain, wherein the captured output is captured in at least one register responsive to sampling a low pass filtered output of the inverting device chains by at least one analog-to-digital converter; and
   adjusting a clock pulse shape of the adjustable clock based on a detected difference between the captured output of the one or more chains having the different inverting device arrangement and the captured output of the reference chain.

2. The system of claim 1, wherein the inverting device chains comprise a plurality of alternating n-type and p-type inverting devices.

3. The system of claim 1, wherein each of the one or more chains having the different inverting device arrangement includes at least one orientation difference in the inverting devices between the one or more chains.

4. The system of claim 1, wherein each of the one or more chains having the different inverting device arrangement comprises a change in layout direction between a vertical and a horizontal cell stack, and every second inverting device is placed in a same row or same column.

5. The system of claim 1, wherein one or more additional structures are positioned proximate to the one or more chains to observe neighborhood impacts.

6. A method for characterizing layout effects of an integrated circuit, the method comprising:
   selecting, by a processor of an integrated circuit development system interfaced with the integrated circuit, an adjustable clock setting of an input clock for a layout effect characterization circuit of the integrated circuit;
   enabling, by the processor, a predetermined duty cycle of the input clock to pass through a plurality of inverting device chains including a reference chain and one or more chains having a different inverting device arrangement and a same number of inverting devices per chain;
   measuring, by the processor, a captured output of the one or more chains having the different inverting device arrangement and a captured output of the reference chain, wherein the captured output is captured in at least one register responsive to sampling a low pass filtered output of the inverting device chains by at least one analog-to-digital converter; and
   adjusting, by the processor, a clock pulse shape of the adjustable clock based on a detected difference between the captured output of the one or more chains having the different inverting device arrangement and the captured output of the reference chain.

7. The method of claim 6, wherein the inverting device chains comprise a plurality of alternating n-type and p-type inverting devices.

8. The method of claim 6, wherein each of the one or more chains having the different inverting device arrangement includes at least one orientation difference in the inverting devices between the one or more chains.

9. The method of claim 6, wherein each of the one or more chains having the different inverting device arrangement comprises a change in layout direction between a vertical and a horizontal cell stack, and every second inverting device is placed in a same row or same column.

10. The method of claim 6, wherein one or more additional structures are positioned proximate to the one or more chains to observe neighborhood impacts.

11. A computer program product comprising a computer readable storage medium having program instructions embodied therewith, the program instructions executable by a processor to cause the processor to perform:

selecting an adjustable clock setting of an input clock for a layout effect characterization circuit of an integrated circuit;

enabling a predetermined duty cycle of the input clock to pass through a plurality of inverting device chains including a reference chain and one or more chains having a different inverting device arrangement and a same number of inverting devices per chain;

measuring a captured output of the one or more chains having the different inverting device arrangement and a captured output of the reference chain, wherein the captured output is captured in at least one register responsive to sampling a low pass filtered output of the inverting device chains by at least one analog-to-digital converter; and adjusting a clock pulse shape of the adjustable clock based on a detected difference between the captured output of the one or more chains having the different inverting device arrangement and the captured output of the reference chain.

12. The computer program product of claim 11, wherein the inverting device chains comprise a plurality of alternating n-type and p-type inverting devices.

13. The computer program product of claim 11, wherein each of the one or more chains having the different inverting device arrangement includes at least one orientation difference in the inverting devices between the one or more chains.

14. The computer program product of claim 11, wherein each of the one or more chains having the different inverting device arrangement comprises a change in layout direction between a vertical and a horizontal cell stack, and every second inverting device is placed in a same row or same column.

15. The computer program product of claim 11, wherein one or more additional structures are positioned proximate to the one or more chains to observe neighborhood impacts.

* * * * *